J. C. LAURITZEN.
SEPARABLE CORE FOR MAKING PNEUMATIC TIRE CASINGS.
APPLICATION FILED MAY 24, 1916.
1,195,480.
Patented Aug. 22, 1916.
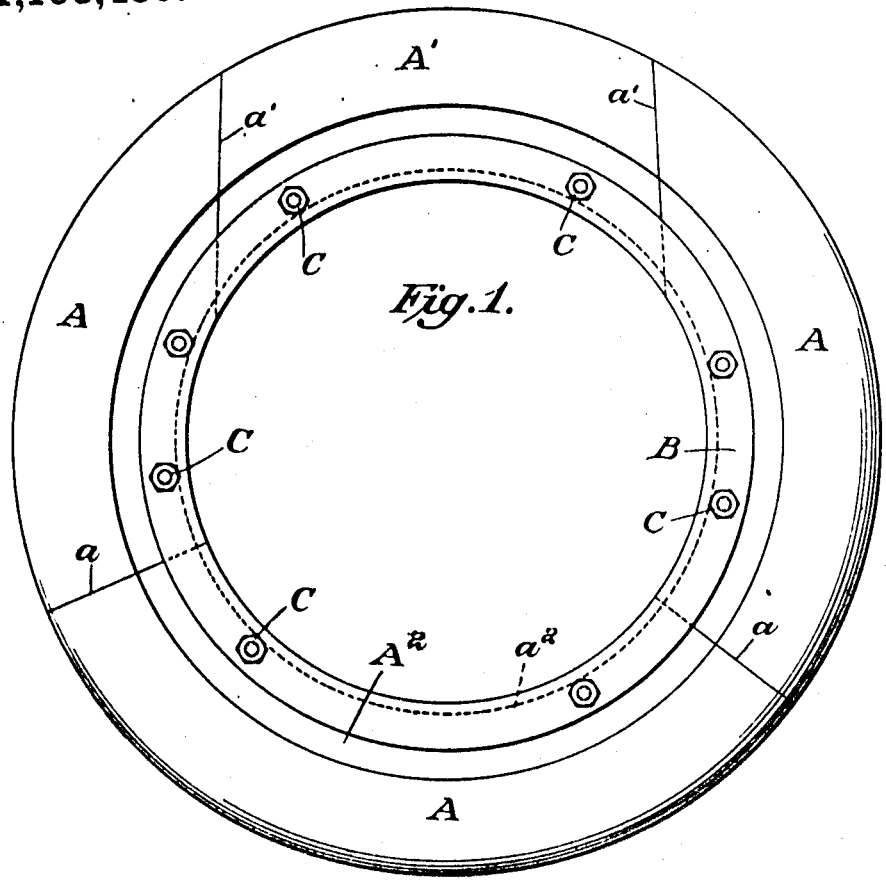
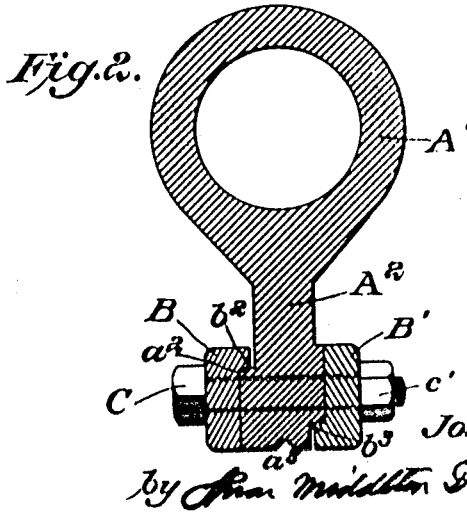
Inventor:
John C. Lauritzen,
by
Attys.

UNITED STATES PATENT OFFICE.

JOHN C. LAURITZEN, OF AKRON, OHIO.

SEPARABLE CORE FOR MAKING PNEUMATIC-TIRE CASINGS.

1,195,480.  Specification of Letters Patent.  Patented Aug. 22, 1916.

Application filed May 24, 1916. Serial No. 99,650.

*To all whom it may concern:*

Be it known that I, JOHN C. LAURITZEN, a citizen of the United States, and resident of Akron, Ohio, have invented certain new and useful Improvements in Separable Cores for Making Pneumatic-Tire Casings, of which the following is a specification.

My present invention relates to improvements in what are known as collapsible or separable cores used for manufacturing outer shoes or casings of double tube pneumatic tires.

Among the objects of the invention are to provide a core of extreme simplicity which will have no taper fits to be accurately machined and which will nevertheless maintain absolute register of the core sections.

With these and other objects in view the invention includes the novel features of construction and arrangement and combination of parts hereinafter described and particularly defined by the appended claims.

A core embodying my invention is illustrated in the accompanying drawing in which;

Figure 1 is a side elevation of such core, and Fig. 2 is a transverse section.

Referring by reference characters to this drawing the ring core proper is shown as consisting of a plurality of sections A, A', one of which is separated from the others by non-radial or converging lines indicated at $a'$, thus making this section wedge-shaped and enabling it to be withdrawn inwardly toward the center of the ring core, after which the outer sections, being unlocked by the removal of section A', which constitutes a key piece, may be separately withdrawn from the tire shoe piece by piece. The lines of severance between the other sections may be radial, as indicated at $a$ and there may be as many sections to the core as desired, four being shown as a convenient number.

The body of the core or portion over which the tire shoe is formed is of the usual shape corresponding to the interior of the finished tire shoe and its inwardly extending annular flange $A^2$ is thickened at its inner edge and provided with two oppositely facing annular shoulders or abutments $a^2$ and $a^3$.

B and B' designate a pair of substantially L-shaped clamping rings designed to be clamped against opposite sides or faces of the thickened portion of the flange $A^2$. The flanges of these rings are in reverse position relative to each other, so that the flange $b^2$ of the ring B surrounds and abuts against the external shoulder $a^2$ of the assembled sections, and holds said sections accurately in position against outward movement, while the flange $b^3$ abuts against the internal shoulder $a^3$ of said assembled sections and holds them against displacement inwardly. The rings B, B' are clamped in position by bolts C passing through the rings and sections and provided with nuts $c'$.

What I claim is:

1. A separable core comprising a plurality of sections of ring form when assembled, and having inwardly extending portions forming an annular flange, said flange having on opposite sides reversely faced shoulders, a pair of clamping rings having reversely placed flanges for coacting with said shoulders, and means for clamping said rings together with the core flange therebetween.

2. A separable core comprising a plurality of sections of ring form when assembled and inwardly extending portions forming an annular flange, said flange being thickened at its inner edge and provided with an outwardly facing shoulder on one side and an inwardly facing shoulder on the other side, a pair of reversely disposed substantially L-shaped clamping rings having their flanges engaging said shoulders, and means for clamping said rings against the opposite faces of said flange.

In testimony whereof I affix my signature.

JOHN C. LAURITZEN.

Copies of this patent may be obtained for five cents each, by addressing the "Commissioner of Patents, Washington, D. C."